United States Patent Office 3,336,130
Patented Aug. 15, 1967

3,336,130
PYRIDAZONE DERIVATIVES AND THEIR USE AS PLANT GROWTH REGULANTS
Adolf Fischer, Mutterstadt, Pfalz, and Franz Reicheneder, Ludwigshafen (Rhine), Germany, and Karl Dury, deceased, late of Kirchheimbolanden, Germany, by Johanna Maria Dury, heiress-at-law, Kirchheimbolanden, Germany, assignors to Badische Anilin- & Soda-Fabrik Aktiengesellschaft, Ludwigshafen (Rhine), Germany
No Drawing. Filed Jan. 15, 1965, Ser. No. 425,966
Claims priority, application Germany, Jan. 21, 1964, B 75,080
5 Claims. (Cl. 71—92)

It is known that pyridazone derivatives, e.g. 1-phenyl-4-amino-5-chloropyridazone-(6) (Canadian patent specification No. 677,143) or 1-phenyl-4-amino-formamidine-5-chloropyridazone-(6) or 1-phenyl-4-acetylamino-5-chloropyridazone-(6) (Canadian patent specification No. 690,128) may be used for weed control. The effectiveness of the compounds is however not satisfactory.

We have now found that the imides of 1-phenyl-4-amino - 5 - chloropyridazone - (6), 1 - phenyl - 4 - amino-5 - bromopyridazone - (6), 1 - cyclohexyl - 4 - amino - 5-chloropyridazone-(6) or 1-cyclohexyl-4-amino-5-bromopyridazone-(6) and dicarboxylic acids or their derivatives have good herbicidal activity. By dicarboxylic acids we understand e.g. oxalic, succinic, maleic, dichloromaleic or phthalic acid. By derivatives we understand (a) compounds formed from the imides by hydrolysis, e.g. amides of dicarboxylic acids, i.e. compounds containing an acid amide group and a carboxyl group, and (b) salts of the amides, i.e. compounds containing an acid amide group and a carboxyl group which is present in the form of a salt. Examples of such salts are alkali metal, alkaline earth metal, ammonium or amine salts, i.e. salts of potassium, sodium, magnesium, calcium, ammonia or organic amines, e.g. methylamine, dimethylamine, ethanolamine, diethanolamine.

Preparation of the salts with amines may be carried out in a simple manner by dissolving the amide or imide in the liquid amine or in a solution of the amine in water or in an organic liquid. Such a solution may be used immediately, i.e. without isolation of the salt from its solution, for plant growth regulation.

By derivatives we also understand amides or imides or their salts of substituted pyridazones, e.g. of N-alkyl derivatives of the said pyridazones.

The agents according to this invention have the great advantage that they dissolve much better in water than prior art agents or are readily converted in the soil under natural conditions into easily soluble compounds.

The agents are distinguished by a much more rapid onset of action and generally better solubility than the prior art compounds and have decidedly good selectivity for weeds among crop plants, e.g. Beta species. Their residual action in the soil is short, which makes more rapid crop rotation possible. The rate of application is about 1 to 10 kg. of active substance per hectare.

In suitable doses the agents according to this invention may also be used for complete destruction or suppression of unwanted vegetation.

The agents according to this invention are prepared by mixing the active substances with conventional diluents. They may also be used in admixture with other biocidal substances. Examples of solid or liquid carrier materials are fertilizers, inert solid carrier materials, talc, diatomaceous earth, water, organic liquids, xylene, petroleum distillates, and synthetic organic liquids.

The pyridazone derivatives to be used in accordance with this invention may be produced analogously to conventional processes. The aminopyridazone and the dicarboxylic acid may for example be condensed by fusing the two substances, by entrainment of water using a suitable solvent, e.g. xylene, if desired by means of a condensing agent, e.g. zinc chloride, or by heating in a solvent, e.g. glacial acetic acid.

Reaction of 1-phenyl-4-amino-5-chloropyridazone-(6) with an excess of oxalyl chloride and subsequent hydrolysis give the semioxamide of 1-phenyl-4-amino-5-chloropyridazone-(6). This compound may then be converted by means of alkalies into the corresponding salt.

Reaction of 1-phenyl-4-amino-5-hydroxypyridazone-(6) with dichloromaleic acid by boiling in glacial acetic acid gives the dichloromaleimide of 1-phenyl-4-amino-5-hydroxypyridazone-(6). This compound is then converted, by treatment with phosphorus oxychloride, thionyl chloride or phosgene, into the dichloromaleimide of 1-phenyl-4-amino-5-chloropyridazone, which on hydrolysis with dilute aqueous caustic soda solution yields the dichloromaleamide acid of 1-phenyl-4-amino-5-chloropyridazone-(6). Some of the compounds to be used according to this invention are specified in the following list:

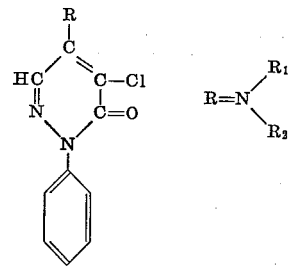

| $R_1$ | $R_2$ | B.P. (° C.) |
|---|---|---|
| H | —CO—COOH | 195–196 |
| H | —CO—COONa | Above 250 |
| CH$_3$ | —CO—COOH | 100–101 |
| H | —CO—CH$_2$—CH$_2$—COOH | 160–162 |
| H | —CO—CCl=CCl—COOH | 158–161 |

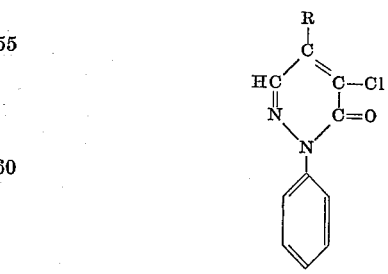

| R | B.P. (°C.) |
|---|---|
| -N(CO-CH=CH-CO) (succinimide-like) | 229-230 |
| -N(CO-CCl=CCl-CO) | 245 |
| -N(CO-CH$_2$-CH$_2$-CO) | 259-260 |
| -N(CO-C$_6$H$_4$-CO) (phthalimide) | 204-206 |
| NH-CO-COOH on pyridazone with C-Cl, cyclohexyl N-substituent | 193-195 |
| NH-CO-COOH on pyridazone with C-Br, phenyl N-substituent | 183-184 |

The following examples illustrate the use of the agents according to this invention and, in particular, show the superiority of these agents to prior art pyridazone derivatives.

Example 1

In a greenhouse, beet (*Beta vulgaris*), wild oats (*Avena fatua*), slender foxtail (*Alopecurus myosuroides*), white mustard (*Sinapis alba*), vetch (Vicia spp.), cleavers (*Galium aparine*), chickweed (*Stellaria media*), small nettle (*Urtica urens*), lamb's-quarters (*Chenopodium album*), mercury (Mercurialis spp.), amaranth (*Amaranthus retroflexus*), sour dock (Rumex spp.), and knot grass (Polygonum spp.) were seeded in loamy sandy soil in plastic pots 8 cm. in diameter and sprayed on the same day with 1-phenyl-4-amino-5-chloropyridazone-(6)-oxalamide and the sodium salt of this compound at a rate of 3 kg. of active substance per hectare dispersed in 500 liters of water per hectare using sodium lignosulfonate as dispersant. After three weeks it was found that both compounds had a very good weed-killing activity. All weeds had almost completely been destroyed. No damage had been caused to beet. The compounds listed on pages 3 and 4 have a similar activity.

Example 2

In a greenhouse, beet (*Beta vulgaris*), white mustard (*Sinapis alba*), wild oats (*Avena fatua*), slender foxtail (*Alopecurus myosuroides*), vetch (Vicia spp.), cleavers (*Galium aparine*), chickweed (*Stellaria media*), small nettle (*Urtica urens*), lamb's-quarters (*Chenopodium album*), mercury (Mercurialis spp.), sour dock (Rumex spp.), and knot grass (Polygonum spp.) having a height of 6 to 10 cm. were sprayed with the following compounds at the rates per hectare indicated, dissolved or dispersed, with the addition of sodium lignosulfonate, in 500 liters of water per hectare: 2.5 kg. of 1-phenyl-4-amino-5-chloropyridazone-(6)-oxalamide+2.5 kg. of sodium carbonate.10H$_2$O (I), 2.5 kg. of the sodium salt of 1-phenyl - 4 - amino - 5 -chloropyridazone - (6) - oxalamide+2.5 kg. of sodium carbonate.10H$_2$O (II), 2.5 kg. of 1-phenyl-4-amino-5-chloropyridazone-(6)+2.5 kg. of sodium lignosulfonate (III), 2.5 kg. of 1-phenyl-4-acetylamino-5-chloropyridazone-(6)+2.5 kg. of sodium lignosulfonate (IV), and 2.5 kg. of 1-phenyl-4-aminoformamidine-5-chloropyridazone-(6)+2.5 kg. of sodium lignosulfonate (V).

After 6 days it was found that active substances I and II had much better weed-killing activity than active substances III, IV and V. None of the five substances caused any damage to beet.

|  | Active substance | | | | |
|---|---|---|---|---|---|
|  | I | II | III | IV | V |
| Crop plants: Beet | 0 | 0 | 0 | 0 | 0 |
| Unwanted plants: |  |  |  |  |  |
| White mustard | 100 | 100 | 60 | 20 | 20 |
| Wild oats | 80 | 70-80 | 20-30 | 0-10 | 10-20 |
| Slender foxtail | 80-90 | 90 | 30 | 10-20 | 10-20 |
| Vetch | 80 | 80-90 | 20-30 | 10 | 10 |
| Cleavers | 70-80 | 70-80 | 20-30 | 10 | 0-10 |
| Chickweed | 90-100 | 90-100 | 30-40 | 10-20 | 10 |
| Small nettle | 90-100 | 90-100 | 40-50 | 10-20 | 20 |
| Lamb's quarters | 100 | 100 | 50 | 10-20 | 20 |
| Mercury | 80-90 | 90 | 20-30 | 10 | 0-10 |
| Sour dock | 100 | 100 | 40 | 10 | 0-10 |
| Knot grass | 80-90 | 80-90 | 30-40 | 0-10 | 10 |

0=No damage. 100=Total destruction.

We claim:
1. A compound of the formula

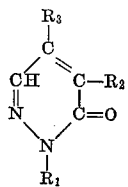

wherein
R₁ is a member selected from the group consisting of phenyl and cyclohexyl;
R₂ is a member selected from the group consisting of chlorine and bromine;
R₃ is a member selected from the group consisting of the substituents

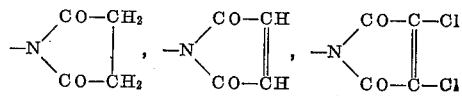

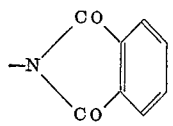

and a substituted amino group having the formula

wherein R₄ is a member selected from the group consisting of hydrogen and lower alkyl and R₅ is a member selected from the group consisting of —CO—COOH, —CO—CH₂—CH₂—COOH,

—CO—CH=CH—COOH

—CO—CCl=CCl—COOH and

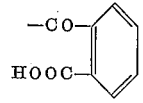

and salts of said compounds having cations selected from the group consisting of alkali metals, alkali earth metals, ammonium, methylammonium, dimethylammonium, ethanolammonium and diethanolammonium.

2. A process for the control of unwanted vegetation wherein a compound as claimed in claim 1 is allowed to act on the plants.

3. A process for the control of unwanted vegetation wherein a compound as claimed in claim 1 is allowed to act on the soil in which the plants are to grow.

4. 1 - phenyl - 4 - amino - 5 - chloropyridazone - (6)-oxalamide.

5. 1 - phenyl - 4 - amino - 5 - chloropyridazone - (6)-oxalamide sodium salt.

References Cited

UNITED STATES PATENTS 3,210,353  10/1965  Reicheneder et al. _____ 260—250

NICHOLAS S. RIZZO, *Primary Examiner.*